(12) United States Patent
Um et al.

(10) Patent No.: US 11,722,907 B2
(45) Date of Patent: Aug. 8, 2023

(54) METHOD AND APPARATUS FOR DETERMINING OPERATING CONDITIONS FOR FREQUENCY COEXISTENCE

(71) Applicant: ELECTRONICS AND TELECOMMUNICATIONS RESEARCH INSTITUTE, Daejeon (KR)

(72) Inventors: Jung Sun Um, Daejeon (KR); Bong-Su Kim, Daejeon (KR); Igor Kim, Daejeon (KR); Seung Keun Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 157 days.

(21) Appl. No.: 17/318,099

(22) Filed: May 12, 2021

(65) Prior Publication Data

US 2021/0360420 A1 Nov. 18, 2021

(30) Foreign Application Priority Data

May 18, 2020 (KR) .................. 10-2020-0059359
Sep. 1, 2020 (KR) .................. 10-2020-0111075

(51) Int. Cl.
*H04W 16/14* (2009.01)
*H04W 48/02* (2009.01)
(Continued)

(52) U.S. Cl.
CPC .......... *H04W 16/14* (2013.01); *H04W 48/02* (2013.01); *H04W 52/242* (2013.01); *H04W 72/0453* (2013.01); *H04W 72/541* (2023.01)

(58) Field of Classification Search
CPC ... H04W 16/14; H04W 48/02; H04W 52/242; H04W 72/0453; H04W 72/082; H04W 24/02
(Continued)

(56) References Cited

U.S. PATENT DOCUMENTS 8,086,187 B1 * 12/2011 Davis ................. H04B 17/3912
455/73
8,838,046 B2 * 9/2014 Fu ......................... H04B 1/525
455/67.7

(Continued)

FOREIGN PATENT DOCUMENTS

JP 2020-036348 A 3/2020
KR 10-1396094 B1 5/2014
(Continued)

OTHER PUBLICATIONS

J. Park, E. Lee, S.-H. Park, S.-S. Raymond, S. Pyo and H.-S. Jo, "Modeling and Analysis on Radio Interference of OFDM Waveforms for Coexistence Study," in IEEE Access, vol. 7, pp. 35132-35147, 2019, doi: 10.1109/ACCESS.2019.2896280. (Year: 2019).*
(Continued)

*Primary Examiner* — Hassan Kizou
*Assistant Examiner* — Oladiran Gideon Olaleye
(74) *Attorney, Agent, or Firm* — LRK Patent Law Firm

(57) ABSTRACT

Provided is a method and apparatus for determining an operating condition for frequency coexistence and an operating condition determining method includes a method of calculating and transferring an inference-free available frequency and an output level to an existing radio station that operates and needs to be protected or a method of calculating a channel access parameter for sharing a frequency with a heterogeneous device, a network, or a system.

13 Claims, 14 Drawing Sheets

(51) Int. Cl.
*H04W 72/0453* (2023.01)
*H04W 52/24* (2009.01)
*H04W 72/541* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 9,491,752 | B2* | 11/2016 | Damnjanovic | ... H04W 72/1215 |
| 9,668,088 | B2 | 5/2017 | Quinn et al. | |
| 9,692,465 | B1* | 6/2017 | Shanholtz | .............. H04B 1/109 |
| 9,743,317 | B2* | 8/2017 | Yi | ............................ H04L 41/30 |
| 10,506,610 | B2* | 12/2019 | Noh | .................... H04W 72/082 |
| 2010/0069125 | A1 | 3/2010 | Yoon et al. | |
| 2010/0137025 | A1* | 6/2010 | Tai | ........................... H04B 3/32 |
| | | | | 455/73 |
| 2011/0081858 | A1* | 4/2011 | Tolentino | .............. H04W 24/02 |
| | | | | 455/63.1 |
| 2011/0151812 | A1 | 6/2011 | Kang et al. | |
| 2012/0106364 | A1* | 5/2012 | Kasslin | ................. H04W 16/14 |
| | | | | 370/252 |
| 2012/0108179 | A1* | 5/2012 | Kasslin | ................. H04W 16/14 |
| | | | | 455/67.13 |
| 2012/0115525 | A1* | 5/2012 | Kang | .................... H04W 16/14 |
| | | | | 455/509 |
| 2013/0005240 | A1* | 1/2013 | Novak | .................. H04W 88/04 |
| | | | | 455/11.1 |
| 2013/0324113 | A1* | 12/2013 | Jechoux | ............ H04W 72/1215 |
| | | | | 455/553.1 |
| 2014/0066086 | A1* | 3/2014 | Jo | .......................... H04W 48/14 |
| | | | | 455/454 |
| 2016/0006499 | A1* | 1/2016 | Jeong | .................. H04B 7/18523 |
| | | | | 455/12.1 |
| 2017/0318470 | A1* | 11/2017 | Srikanteswara | .... H04W 52/367 |
| 2019/0373618 | A1* | 12/2019 | Medina | ................. H04L 5/0044 |
| 2021/0135703 | A1* | 5/2021 | Martone | ................ G01S 7/4008 |
| 2022/0264312 | A1* | 8/2022 | Furuichi | .............. H04B 7/0617 |

FOREIGN PATENT DOCUMENTS

| | | |
|---|---|---|
| KR | 10-2018-0103327 A | 9/2018 |
| KR | 10-2029151 B1 | 10/2019 |

OTHER PUBLICATIONS

O. G. Olaleye, A. Ali, A. Aly, M. A. Iqbal, D. Perkins and M. Bayoumi, "Framework for generating and designing spectrum awareness modules for opportunistic networking," 2017 IEEE 8th Annual Ubiquitous Computing, Electronics and Mobile Communication Conference (UEMCON), 2017, pp. 522-527. (Year: 2017).*

M. A. Hossain and R. Passerone, "Power Adaptive Cognitive Pilot Channel for Spectrum Co-existence in Wireless Networks," 2011 IEEE International Conference on Advanced Information Networking and Applications, 2011, pp. 9-16, doi: 10.1109/AINA.2011.29. (Year: 2011).*

* cited by examiner

METHOD AND APPARATUS FOR DETERMINING OPERATING CONDITIONS FOR FREQUENCY COEXISTENCE

CROSS-REFERENCE TO RELATED APPLICATION(S)

This application claims the priority benefit of Korean Patent Application No. 10-2020-0059359 filed on May 18, 2020, and Korean Patent Application No. 10-2020-0111075 filed on Sep. 1, 2020, in the Korean Intellectual Property Office, the disclosures of which are incorporated herein by reference for all purposes.

BACKGROUND

1. Field of the Invention

One or more example embodiments relate to a method and apparatus for determining an operating condition for frequency coexistence, and more particularly, to calculating a sharing operating condition at an available frequency to share a spectrum.

2. Description of Related Art

A frequency sharing technology allows different radio stations, services, or systems to share limited resources in at least one of a time domain, a spatial domain, a frequency time, and a signal level.

For example, in an ultra high frequency (UHF) television (TV) broadcast band using the band of 479 to 698 megahertz (MHz), a broadcast service is provided as a primary service or a primary user from a broadcast radio station. In the US using the band of 3.55 to 3.7 gigahertz (GHz), a radar system is being used as a primary user. In this band, a user protecting an existing primary service and having a relatively low priority currently provides a new wireless communication service. The band used in the US is called Citizens Broadband Radio Service (CBRS). In a TV broadcast band, a new radio station uses the same channel or an adjacent channel at a position separate by a keep-out distance in which a TV receiver is not affected based on a service coverage of a broadcast signal.

Here, in the CBRS, a channel available by a new radio station is defined or an available area is defined for a channel in which a primary service operates, in order not to interfere with a radar system in a sharp antenna beam pattern area.

Meanwhile, a review for frequency sharing is currently ongoing even in the band of 5925 to 7125 MHz. The band of 6 GHz is globally distributed and used for fixed communication, fixed broadcast relay, and fixed satellite uplink. In some countries, it is also used as a mobile broadcast relay service and an existing service is primarily a subject to be projected. Here, a primary service, a primary system, and a primary radio station are included. A radio station considered to share a frequency resource with the corresponding primary service is defined as a secondary service, a secondary system, and a secondary radio station if a frequency use right is low.

As an example of the secondary service, an unlicensed radio station or an unlicensed radio communication system, such as Wireless Fidelity (Wi-Fi), Long Term Evolution (LTE)-Licensed Assisted Access (LAA), and 5-th generation (5G) new radio unlicensed (NR-U), and an unlicensed radio device may be considered. The unlicensed radio device may be used by a user at an arbitrary position. However, if a protection target is present as the primary service, such as the band of 6 GHz, output power, an operable position, and an available frequency resource may be limited.

Therefore, there is a need to calculate an available frequency(s) or channel(s) at an arbitrary position or a specific position of an unlicensed radio device, to calculate a geographical area operable in a specific frequency(s) or channel (s), or to calculate an output level, a transmission power, or a transmission power density allowed for the unlicensed radio device to transmit a signal. Also, for different unlicensed radio devices to share a frequency resource in a certain area, a method of calculating and sharing operating conditions for sharing is required.

SUMMARY

At least one example embodiment provides a method and apparatus for deriving an operating condition for frequency sharing and a structure and an operation procedure of the apparatus.

According to an aspect of at least one example embodiment, there is provided an operating condition determining method performed by an operating condition determining apparatus, the operating condition determining method including receiving static information about a coexistence map that includes coexistence condition information from a coexistence analysis engine that interacts with the operating condition determining apparatus; and determining available operation information using dynamic information of an unlicensed radio device that desires to use a communication service based on the static information.

The determining of the available operation information may include determining available operation information that includes at least one of an output level, an available channel, and an interference level triggered by a clutter based on the static information.

The determining of the available operation information may include determining a pathloss from a position of an unlicensed radio device installed in an existing radio station to the existing radio station based on the static information; determining a frequency dependent rejection (FDR) between the unlicensed radio device installed in the existing radio station and the existing radio station; calculating an interference level received at the existing radio station based on the FDR; calculating at least one of an available channel, a power density, and a power level of the existing radio station based on the interference level; and setting available operation information according to dynamic information based on at least one of the available channel, the power density, and the power level of the existing radio station.

The determining of the FDR may include determining the FDR based on a center frequency according to an operating bandwidth of the unlicensed radio device installed in the existing radio station and a center frequency according to an operating bandwidth of the existing radio station.

The calculating of the at least one may include consecutively calculating a power density according to a frequency separation based on the interference level.

The calculating of the at least one may include comparing an interference level according to a center frequency and a bandwidth of the unlicensed radio device installed in the existing radio station with a predefined protection standard and calculating the available channel and the power level.

According to an aspect of at least one example embodiment, there is provided an operating condition determining method performed by a coexistence analysis engine, the operating condition determining method including generating coexistence condition information about an existing radio station in which an unlicensed radio device is installed in a unit area in which an operating condition for frequency coexistence is calculated; generating a coexistence map for sharing the coexistence condition information; and transferring the coexistence map to an operating condition determining apparatus.

The generating of the coexistence condition information may include, in response to an operation of the unlicensed radio device that is installed at a specific height of the existing radio station in the unit area, generating coexistence condition information according to a position and a unit bandwidth of the unlicensed radio device.

The coexistence condition information may include at least one of protection target information associated with the existing radio station, basic information about the unit area, and sharing information associated with a frequency.

The operating condition determining method may further include setting coexistence condition information based on the existing radio station and an existing radio station different from the existing radio station when the existing radio station and the different existing radio station are present in the unit area.

The setting of the coexistence condition information may include calculating coexistence condition information according to a position and a unit bandwidth of the different existing radio station by considering an interference effect with the different existing radio station based on the coexistence condition information.

The generating of the coexistence map may include generating a coexistence map that sequentially includes frequencies of unit bandwidths included in a plurality of pieces of coexistence condition information, respectively, when the plurality of pieces of coexistence condition information correspond to the existing radio station and the different existing radio station.

According to an aspect of at least one example embodiment, there is provided an operating condition determining apparatus including a processor. The processor is configured to receive static information about a coexistence map that includes coexistence condition information from a coexistence analysis engine that interacts with the operating condition determining apparatus, and determine available operation information using dynamic information of an unlicensed radio device that desires to use a communication service based on the static information.

According to an aspect of at least one example embodiment, there is provided a coexistence analysis engine including a processor. The processor is configured to generate coexistence condition information about an existing radio station in which an unlicensed radio device is installed in a unit area in which an operating condition for frequency coexistence is calculated, generate a coexistence map for sharing the coexistence condition information, and transfer the coexistence map to an operating condition determining apparatus.

According to some example embodiments, an operating condition determining method may calculate and share operating conditions for joint use to share frequency resources in a desired area.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings.

Figure 1:
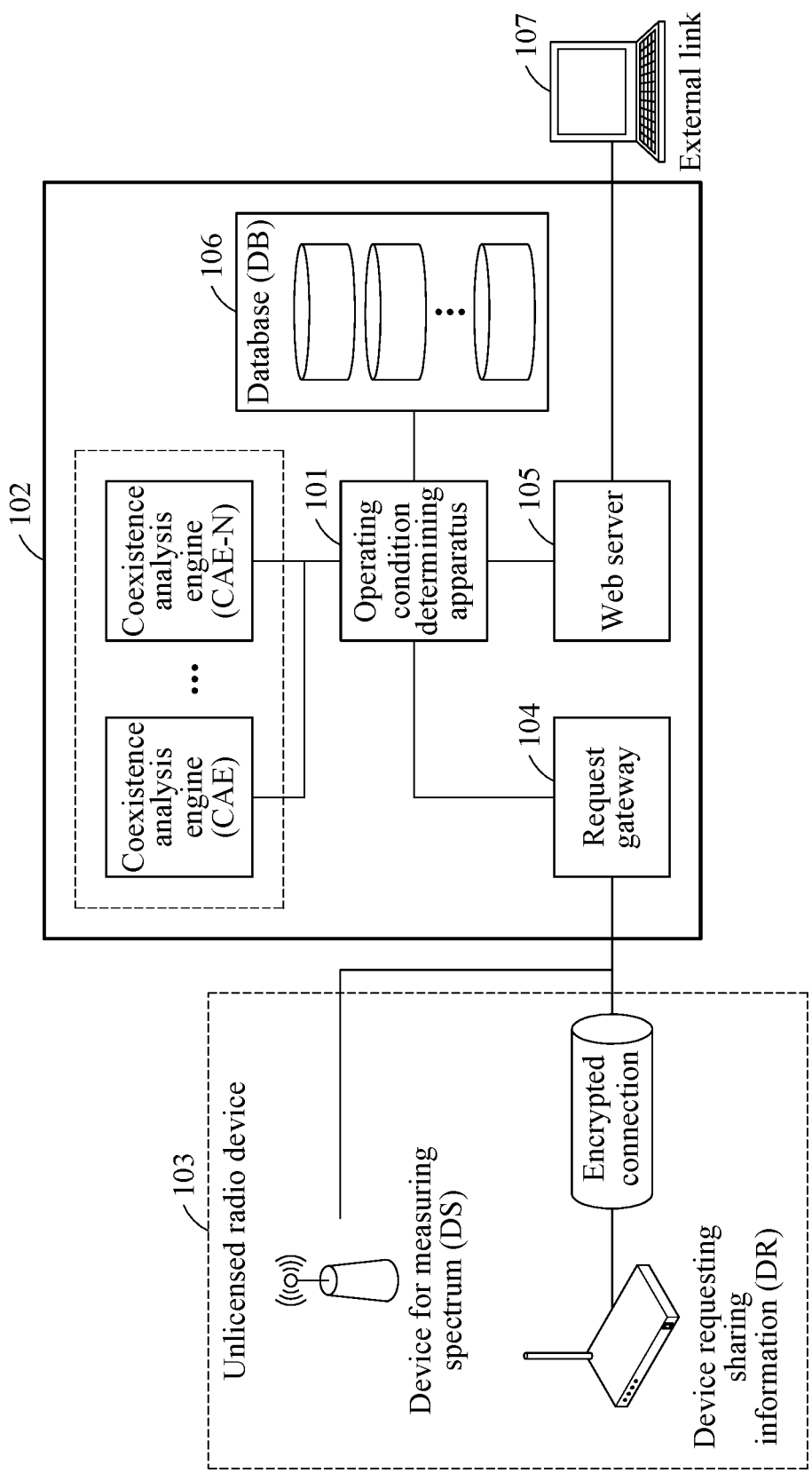
FIG. 1 is diagram illustrating an example of a sharing system for frequency coexistence according to an example embodiment.

FIG. 1 is a diagram illustrating an example of a sharing system for frequency coexistence according to an example embodiment.

Referring to FIG. 1, the sharing system is in a structure to calculate and provide sharing operation information. To this end, the sharing system may include an operating condition determining apparatus 101, a coexistence analysis engine (CAE) 102 that is an application engine (AE), a request gateway (RG) 104, a web server (WS) 105, and a database 106, for example, a database set.

In detail, the operating condition determining apparatus 101 may function as a main entity component (MEC) that may control the overall operation of the sharing system and may allow a manager or a user of the sharing system to validate an operation situation. The term "main entity component (MEC)" used herein may represent a computer-related entity, hardware, combination of hardware and software, software, or software in execution. The operating condition determining apparatus 101 may be connected to each of detailed components that constitute the sharing system.

A device requesting sharing information (DR), a device for measuring a spectrum (DS), an external device, a server, or a network may be connected to the request gateway 104 or the web server 105. The database 106 may store priori data or calculated and provided information in an integrated SS form or in each separate form.

The coexistence analysis engine 102 may operate according to a required function and a plurality of coexistence analysis engines 102 may be provided. Also, the coexistence analysis engine 102 may be configured and connected at an outside of the sharing system with respect to some functions.

The operating condition determining apparatus 101 may calculate an optimal sharing operating condition about an unlicensed radio device 103 based on static information and dynamic information. The operating condition determining apparatus 101 may calculate the optimal sharing operating condition using the following three methods.

① Static Information

The operating condition determining apparatus 101 may directly apply the static information as the optimal sharing operating condition. Here, the static information may include information about an operation, an arrangement, and an installation of an existing service system and may include information calculated or derived in advance from existing service information. Also, the static information may include information defined for strategic purposes according to frequency and spectrum management requirements.

Therefore, the operating condition determining apparatus 101 may calculate the static information that includes existing service information as the optimal sharing operating condition to share a frequency with respect to an existing service corresponding to a primary protection target.

② Dynamic Information

The operating condition determining apparatus 101 may calculate and determine the optimal sharing operating condition using the dynamic information in real time. Here, the dynamic information may include information provided from the DR that requires an operating condition. The information provided from the DR may include a position (e.g., indoor or outdoor, latitude/longitude, height, and antenna height) of the DR, a desired operating frequency range or bandwidth, and a DR service type. The dynamic information may include sensing information of the DS configured to sense a spectrum.

Therefore, the operating condition determining apparatus 101 may calculate, as the optimal sharing operating condition, the dynamic information that includes the sensing information or the information provided from the DR such that the user may use a communication service at an arbitrary position.

③ Static Information and Dynamic Information

The operating condition determining apparatus 101 may calculate the optimal sharing operating condition using dynamic information based on information classified in stages for static information. The operating condition determining apparatus 101 may use the static information and the dynamic information in each of the following cases.

(a) Use of Pre-Calculated Static Information

The operating condition determining apparatus 101 may calculate operating condition information in advance by considering a case in which the unlicensed radio device 103 is present at an arbitrary position and a building height. The operating condition information may correspond to the static information. Here, the unlicensed radio device 103 may be collectively referred to as a radio local area network (RLAN) that is a secondary service when a frequency use right is low in a radio station considered to share a frequency resource with a primary service. In general, the RLAN may be used by a user at an arbitrary position and, herein, may be defined as the unlicensed radio device 103.

The operating condition determining apparatus 101 may determine whether to calculate an additional sharing operating condition based on the pre-calculated static information, through the dynamic information. The operating condition determining apparatus 101 may provide the dynamic information to the unlicensed radio device 103 as a further detailed sharing operating condition.

For example, herein, information in which an interference level exceeds an interference standard from a predetermined height in a unit area (hereinafter, a unit area) in which each operating condition is calculated may be included in the static information. Here, in general, the interference level increases as the height increases and effect of a clutter, such as a surrounding building, decreases.

The operating condition determining apparatus 101 may determine a state of the interference level based on height information about a height at which the unlicensed radio device 103 is installed and the static information. Depending on a determination result, the operating condition determining apparatus 101 may not calculate the additional sharing operating condition with respect to a predetermined height or more and may calculate the additional sharing operating condition with respect to the predetermined height or less.

(b) Use of Pre-Calculated Static Information Based on a Unit Height

The operating condition determining apparatus 101 may pre-calculate a sharing operating condition as static information every unit height in a unit area. The operating condition determining apparatus 101 may determine the sharing operating condition about a most adjacent height or an adjacent height having a relatively high value using dynamic information, such as a position and a height at which the unlicensed radio device 103 is installed based on static information.

(c) Request of Another Device

When another unregistered device additionally requests a sharing operating condition in a state in which the unlicensed radio device 103 is present in a unit area, the operating condition determining apparatus 101 may calculate the sharing operating condition based on static information and dynamic information. This configuration is further described with reference to FIG. 13.

(d) Dynamic Parameter

The operating condition determining apparatus 101 may calculate a dynamic parameter of a procedure in which a plurality of RLANs accesses a channel to emit a signal to an operating channel in at least one unit area by considering a service coverage of the corresponding unlicensed radio device 103. The operating condition determining apparatus

101 may provide the calculated dynamic parameter to the unlicensed radio devices 103.

(e) Real-Time Operation Information

The operating condition determining apparatus 101 may provide the sharing operating condition to the unlicensed radio devices 103 based on information that includes an existing service signal considering mobility or real-time operation information of an existing service.

Figure 2:
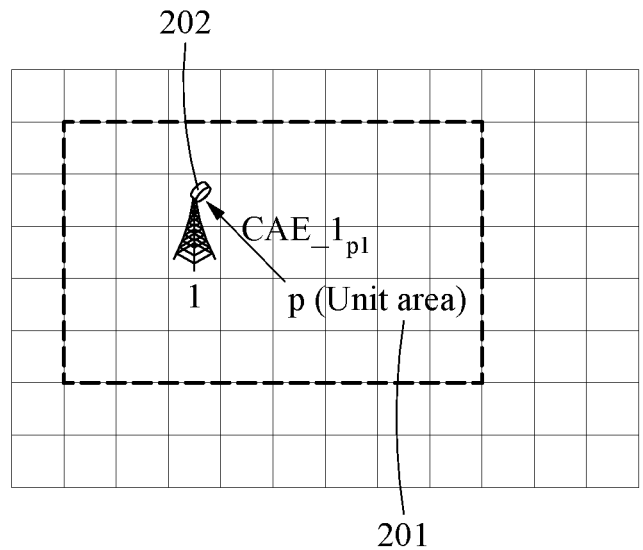
FIG. 2 illustrates an example of describing an operation of a coexistence analysis engine according to an example embodiment.
Figure 2:
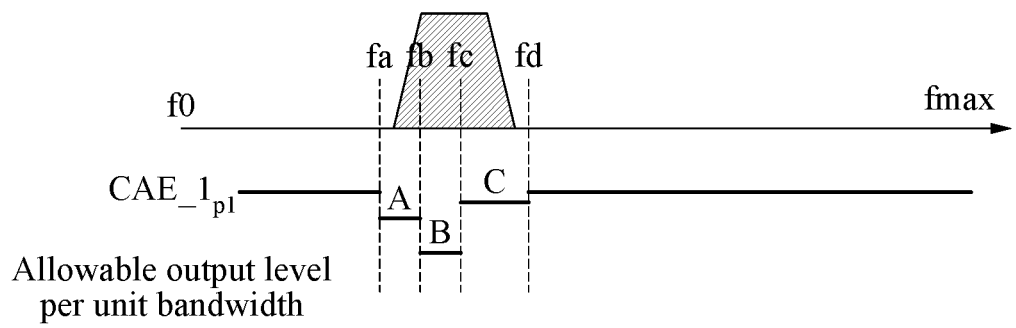

FIG. 2 illustrates an example of describing an operation of a coexistence analysis engine according to an example embodiment.

Referring to FIG. 2, a plurality of coexistence analysis engines (CAEs) may be configured on a sharing system. One of the plurality of coexistence analysis engines may calculate a sharing operating condition with an existing service. The coexistence analysis engine may be one of the coexistence analysis engines of FIG. 1 and may perform the following operations.

The coexistence analysis engine may generate coexistence condition information about an existing radio station 202 in which an unlicensed radio device is installed in a unit area in which an operating condition for frequency coexistence is calculated. When the unlicensed radio device installed at a specific height of the existing radio station 202 operates in the unit area, the coexistence analysis engine may calculate coexistence condition information according to a position and a unit bandwidth of the unlicensed radio device.

In detail, when the unlicensed radio device operates at a specific height in a unit area p 201, the coexistence analysis engine may include calculation of a maximum interference level, available channel, and output level in primary coexistence condition information. The primary coexistence condition information may be included in static information. For example, $CAE\_1_{p1}$ may represent a primary coexistence condition about a "number 1" existing service radio station in the unit area p 201.

The coexistence analysis engine may calculate output result data about the primary coexistence condition information in a JavaScript Object Notation (JSON) structure of the following Table 1. The calculated output result data may be stored in a form of a file or may be transferred to the operating condition determining apparatus. The output result data may be in a structure to fetch a stored file or collect data transferred to a MEC or data about each unit area p 201 and to transfer the file or the data to a database and store the same in the database.

TABLE 1

| Field Name | Field Data Type | Descriptions | Remarks |
|---|---|---|---|
| incumbent Info | String | A unique ID of a fixed ratio station or a different existing radio station. Use the same value defined from a sharing DB in the case of the fixed radio station. | |
| gridSetInfo | Object: GridSetInfo | Includes latitudinal and longitudinal coordinates of a center point of a leftmost end and a number of left and right grids based on a center grid, as information of a grid set that constitutes a protection area. | |
| coexSpectrumInfo | Array of Object: | Combination of a grid point, RLAN height, | |

TABLE 1-continued

| Field Name | Field Data Type | Descriptions | Remarks |
|---|---|---|---|
| | | interference to noise (I/N) and frequency range according to output power or PSD, max equivalent isotropic radiated power (EIRP), channel information, etc. | |

The output result data may include fields of protection target existing radio station information, unit area information, and sharing information based on a data format of the JSON structure. An object related to each field may be defined in the following Table 2 to Table 4.

Here, in Table 2, a field related to the protection target existing radio station information included in the data format of the JSON structure may be defined.

TABLE 2

| Field Name | Field Data Type | Descriptions | Remarks |
|---|---|---|---|
| incumbentID | number | A length unit (m) of one side of a single grid with a square size | |
| longitude | number | A longitudinal coordinate of a fixed station or an existing radio station | |
| latitude | number | A latitudinal coordinate of a fixed station or an existing radio station | |
| centerFrequency | number | A center frequency (MHz) of a fixed station or an existing radio station service | |
| bandwidth | number | A bandwidth (MHz) of a fixed station or an existing radio station service | |

Here, in Table 3, a field related to unit area information included in the data format of the JSON structure may be defined.

TABLE 3

| Field Name | Field Data Type | Descriptions | Remarks |
|---|---|---|---|
| size | number | A length unit (m) of one side of a single grid with a square size | |
| longitudeRef | number | A longitudinal coordinate of a center point of a reference grid | |
| latitudeRef | number | A latitudinal coordinate of a center point of a reference grid | |
| numColumn | number | A number of columns of a grid that constitutes a grid set including a reference grid | |
| numRow | number | A number of rows of a grid | |

TABLE 3-continued

| Field Name | Field Data Type | Descriptions | Remarks |
|---|---|---|---|
| numGrid | number | that constitutes a grid set including a reference grid A total number of grids that constitute a grid set | Optional |

Here, in Table 4, a field related to sharing information included in the data format of the JSON structure may be defined.

TABLE 4

| Field Name | Field Data Type | Descriptions | Remarks |
|---|---|---|---|
| gridIndex | number | An $n^{th}$ grid based on a reference grid 1 or 0 | |
| RLANheight | number | A height of RLAN considered for interference analysis | |
| usedPower | number | A power level of RLAN considered for interference analysis | |
| usedPSD | number | Output power spectrum density of RLAN considered for interference analysis | |
| IN | number | I/N (dB) calculated based on the usedPower or usedPSD condition and a bandwidth of an existing radio station at RLAN height | |
| coexConditionInfo | Object: array of coexConditionInfo | Maximum allowable EIRP for each frequency domain | |

Here, sharing information may correspond to the operating condition and the operating condition or the sharing information may include and use at least one of frequency information, output information, and a channel access parameter. Here, the output information may be an allowable output level or output power density of a signal emitted from an unlicensed radio device. The channel access parameter may represent a parameter required for the unlicensed radio device to access a channel. For example, the channel access parameter may be a parameter used to determine a window size or a size of random back-off or a set of window sizes. Alternatively, in the case of a channel access method using a probability distribution characteristic, the channel access parameter may be a type of probability distribution or a value, such as an average or variance of probability distribution.

TABLE 5

| Field Name | Field Data Type | Descriptions | Remarks |
|---|---|---|---|
| lowfrequency | number | Lower frequency of a frequency domain | |
| highfrequency | number | Upper frequency of a frequency domain | |
| MaxEirp | number | RLAN allowable EIRP in the domain (total radiated power or power per MHz) | |

Table 5 may relate to coexConditionInfo among objects of Table 4. That is, coexConditionInfo may be configured in a plurality of pieces in the field of coexSpectrumInfo, and may transfer a different piece of data for each frequency domain as shown in (b) of FIG. 2. For example, (b) of FIG. 2 illustrates an example of configuring information using a power density per unit bandwidth that includes five elements.

Figure 3:
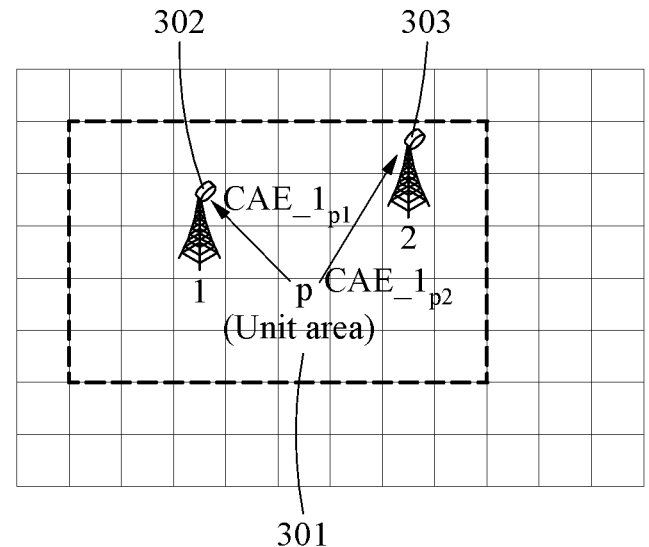
FIG. 3 illustrates an example of describing an operation of a coexistence analysis engine according to another example embodiment.
Figure 3:
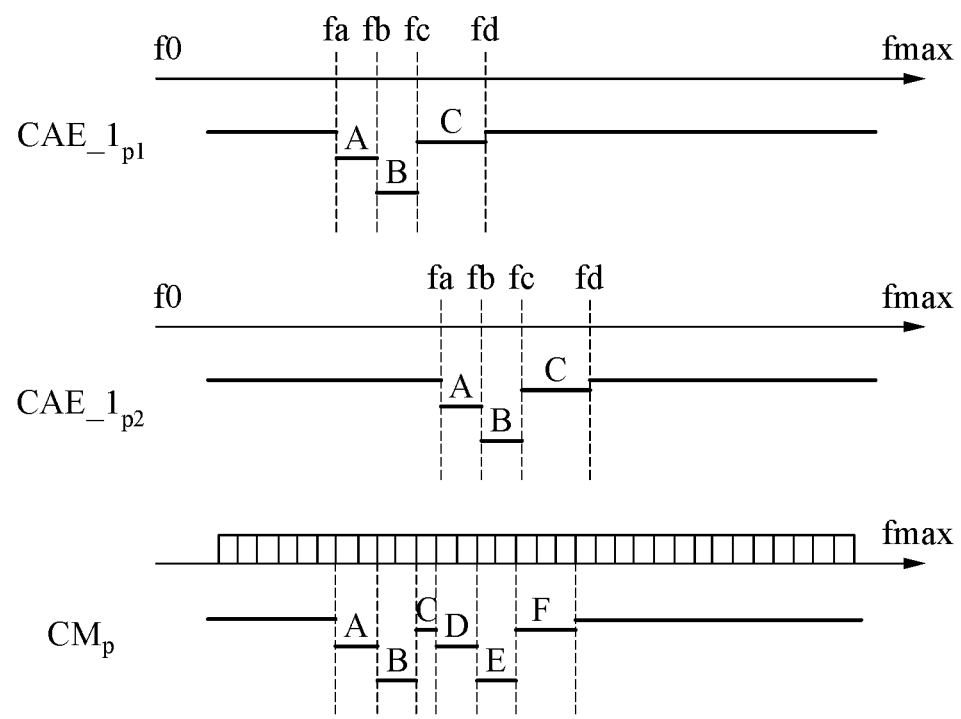

FIG. 3 illustrates an example of describing an operation of a coexistence analysis engine according to another example embodiment.

Referring to FIG. 3, information calculated for an existing radio station 302 per unit area p 301 may be stored and managed in a database. Here, the existing radio station 302 may be a radio station corresponding to a protection target. For example, (a) of FIG. 3 illustrates an example in which an interference effect may occur in two existing service radio stations in a single unit area. A coexistence analysis engine may manage a secondary operating condition in which primary operating conditions are integrated in the unit area p 301 into consideration of different service radio stations. That is, when the existing radio station 302 and another existing radio station 303 different from the existing radio station 302 are present in a unit area, the coexistence analysis engine may set coexistence condition information that considers the existing radio station 302 and the other existing radio station 303 different therefrom.

The coexistence analysis engine may generate the coexistence condition information set to the existing radio station and the coexistence condition information set to the other existing radio station as a coexistence map (CM) to be shared. The coexistence analysis engine may generate the coexistence map in which a frequency of a unit bandwidth included in each of a plurality of pieces of coexistence condition information is sequentially listed.

Figure 4:
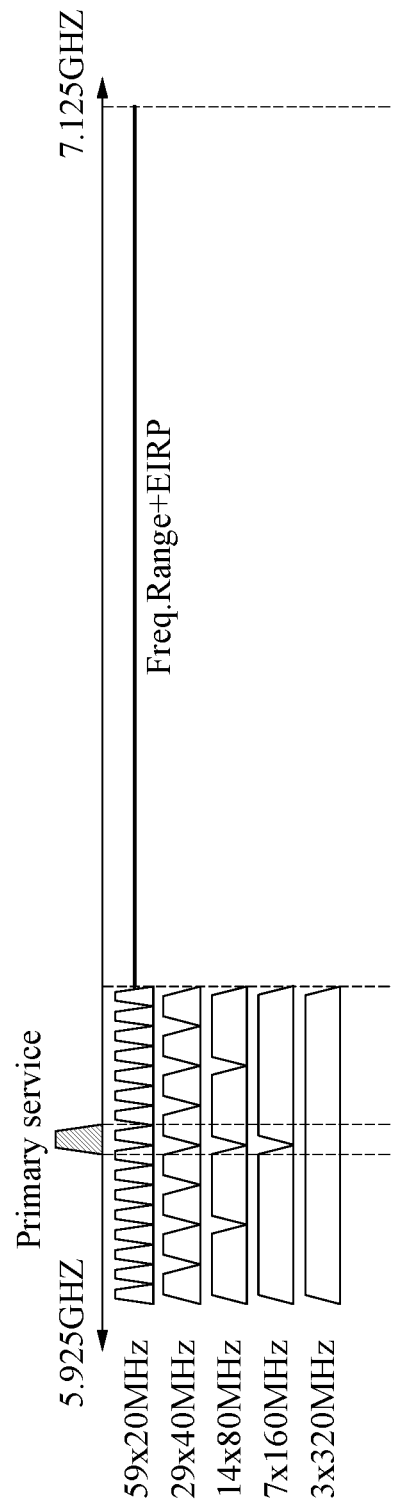
FIG. 4 illustrates an example of describing an operation of receiving an output level for a bandwidth and a center frequency provided from an unlicensed radio device according to an example embodiment.

FIG. 4 illustrates an example of describing an operation of receiving an output level for a bandwidth and a center frequency provided from an unlicensed radio device according to an example embodiment.

An operating condition determining apparatus may receive static information from a coexistence analysis engine. The operating condition determining apparatus may generate available operation information to be transferred to an unlicensed radio device from a coexistence map included in the static information. The operating condition determining apparatus may generate the available operation information using only sharing information that is static information or using even dynamic information such as sensing information that is sensed by the unlicensed radio device or a device for measuring spectrum (DS). The available operation information may be the following examples. An operating condition included in the available operation information may include a plurality of pieces of information of the respective examples or may be a combination of the respective examples or a combination of a plurality of configurations.

① Method 1

The operating condition determining apparatus may set an operating condition included in available operation information using a definition of Table 5 of FIG. 3 or using a configuration of fields included in Table 5 of FIG. 3. The operating condition determining apparatus may transfer, to the unlicensed radio device, the available operation information that meets the operating condition.

The unlicensed radio device may determine an output level about a desired center frequency and bandwidth based on the available operation information received from the operating condition determining apparatus. Herein, when different output levels are defined in an operating bandwidth of a single unlicensed radio device, the output levels need to be defined to meet all the conditions.

According to method 1, the operating condition determining apparatus may generate available operation information capable of validating a predetermined frequency domain and an available output level (total radiated power or power density) in the unlicensed radio device.

② Method 2

The operating condition determining apparatus may set an operating condition included in available operation information using a configuration of a format or a field defined in Table 6. The operating condition determining apparatus may need to validate candidate operating bandwidth and center frequency information of a system to receive a message.

TABLE 6

| Field Name | Field Data Type | Descriptions | Remarks |
|---|---|---|---|
| bandwidth | number | A bandwidth value (e.g., 20, 40, 80, 160, 320) used for analysis Unit: MHz | |
| centerFreq | number | Center frequency | |
| eirp | number | An EIRP value considered for a defined center frequency and bandwidth (total radiated power or power per MHz) | |

According to method 2, the operating condition determining apparatus may generate available operation information capable of validating available output level (total radiated power or power density) information according to an RLAN operating bandwidth and center frequency in an unlicensed radio device.

③ Method 3

The operating condition determining apparatus may generate available operation information based on the aforementioned method 1 and method 2. In detail, an area in which a maximum power level is available may be defined as in method 1 and a frequency overlapping or adjacent to a frequency of an existing service radio station may be defined as in method 2. In the following Table 7, fields that do not include values of some fields according to purpose of configuration information according to the example embodiment are defined.

TABLE 7

| Field Name | Field Data Type | Descriptions | Remarks |
|---|---|---|---|
| lowfrequency | number | Lower frequency of a frequency domain | |
| highfrequency | number | Upper frequency of a frequency domain | |
| bandwidth | number | A bandwidth value (e.g., 20, 40, 80, 160, 320) used for analysis Unit: MHz | |
| centerFreq | number | Center frequency | |
| eirp | number | An EIRP value considered for a defined center frequency and bandwidth (total radiated power or power per MHz) | |

According to method 3, the operating condition determining apparatus may minimize a number of sets of messages or may minimize a function of selecting and calculating an output level of an unlicensed radio device. Here, an area defined according to method 1 may be determined based on an output level that meets a technology criterion or rule in which a total radiation level is predefined based on a channel bandwidth and may include a function of supporting an unlicensed radio device that is operable in a plurality of bandwidths. Also, in an area defined according to method 2, the unlicensed radio device may operate only at an output level received with respect to a provided bandwidth and center frequency.

Therefore, referring to FIG. 4, information of a frequency domain that includes a maximum bandwidth overlapping a position at which a primary service operates may be configured as in method 2. In a remaining area, frequency domain and output level information may be transferred.

Figure 5:
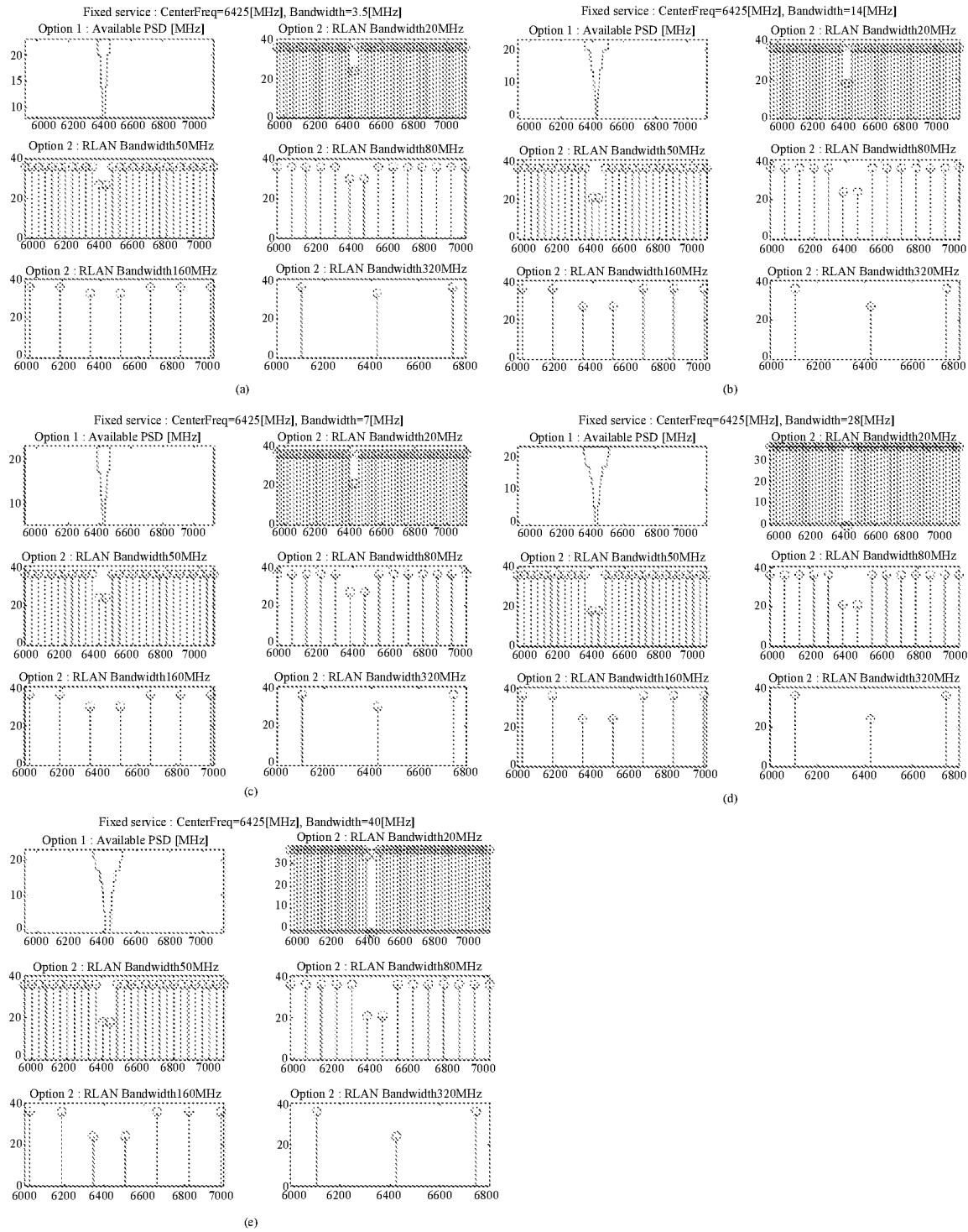
FIG. 5 illustrates an example of describing an available bandwidth at a center frequency with assuming an existing radio station as an interferer according to an example embodiment.

FIG. 5 illustrates an example of describing an available bandwidth at a center frequency with assuming an existing radio station as an interferer according to an example embodiment.

Referring to FIG. 5, an operating condition determining apparatus may calculate an available channel or available (allowable) power level and an example embodiment of a method thereof may be configured as the following stages. Here, description is made by defining an unlicensed radio device (RLAN) as an interferer that is a source to cause interference and an existing radio station as an interferee that is a target to receive the interference. The order of the following stage 1 to stage 3 may be changed and included in each stage.

Stage 1) Derive a pathloss from a position of the interferer to the interferee.

Stage 2) Derive a frequency dependent rejection (FDR) from a transmission (Tx) mask of the interferer to a reception (Rx) filter of the interferee.

Stage 3) Calculate an interference level received at the interferee.

Stage 4) Calculate available (allowable) power density and power level of the interferer allowed compared to a protection standard, from an Rx interference level.

Option 1) Consecutively calculate power density according to frequency separation.

Option 2) Available channel and available power level according to an operating center frequency and bandwidth of the interferer In stage 1, the operating condition determining apparatus may determine a pathloss from a position of an unlicensed radio device installed in an existing radio station to the existing radio station based on static information. Here, the pathloss may consider height information of the interferer, surrounding terrain, and information about surrounding artificial structures. Also, the pathloss may consider a transmission loss occurring when a signal is transmitted from an inside to an outside of a building. Also, the pathloss may consider according to an antenna mismatch between the interferer and the interferee.

In stage 2, the operating condition determining apparatus may determine a frequency dependent rejection (FDR) between the unlicensed radio device installed in the existing radio station and the existing radio station. The FDR may be calculated based on a mask discrimination (MD) and a net filter discrimination (NFD).

In detail, the MD may represent a decrease amount of interference power occurring due to a filter shape of a Tx spectrum and an Rx selectivity mask. A value of the MD may vary based on operating bandwidth and mask characteristics of the unlicensed radio device corresponding to the interferer and the existing radio station corresponding to the interferee.

The NFD may calculate an overlapping area according to center frequency offsets for a mask of the unlicensed radio device corresponding to the interferer and a mask of the existing radio station corresponding to the interferee. When a frequency offset is absent, it may correspond to the same domain and a value may become zero. According to an increase in the frequency offset, the overlapping area may decrease and a value may also increase.

The FDR may be calculated using a sum of the MD and the NFD and may vary based on center frequencies of the unlicensed radio device corresponding to the interferer and the existing radio station corresponding to the interferee. In calculating the FDR, the operating condition determining apparatus may calculate a single integrated FDR by considering all the available bandwidths of the unlicensed radio device corresponding to the interferer and may use the calculated FDR in stages 3 and 4.

In stage 3, the operating condition determining apparatus may calculate an interference level received at the existing radio station based on the FDR. Here, the interference level may be calculated based on the FDR with assumption that an interference signal has the same power density across the entire bandwidth of the unlicensed radio device corresponding to the interferer. An interference level received at an Rx filter of the existing radio station corresponding to the interferee may be calculated as a different value based on a bandwidth of the unlicensed radio device corresponding to the interferer and center frequencies of the unlicensed radio device corresponding to the interferer and the existing radio station corresponding to the interferee. The interference level may be defined as power density per unit bandwidth and the power density may be as, for example, power density per 1 MHz.

Alternatively, the interference level may be calculated based on the FDR by assuming a total radiated power level of a signal emitted from the unlicensed radio device corresponding to the interferer.

In stage 4, the operating condition determining apparatus may calculate a total power level per bandwidth, available (allowable) power density, or available channel, by comparing the interference level according to the interference power density or the bandwidth and the center frequency of the interferer of stage 3 to a predefined protection standard.

(a) to (e) of FIG. 5 are graphs showing example results according to the aforementioned stages. Herein, an existing radio station is set as a fixed service and assumed as an interferer and five bandwidths are assumed to be available for a center frequency of 6425 MHz.

Option 1 of stage 4 assumes an integrated FDR for five bandwidths (20, 40, 80, 160, 320 MHz) of RLAN. Option 2 of stage 4 relates to a power level per interference (allowable) bandwidth calculated for each available center frequency with respect to each of the five bandwidths of the unlicensed radio device. Herein, if a power level value is less than a condition under the condition that the power level is not used as a specific value or less, a corresponding center frequency may be excluded from available channel information. In each of the graphs (a) to (e) of FIG. 5, a maximum power level allowed for each operating frequency is assumed as 36 dBm.

Figure 6:
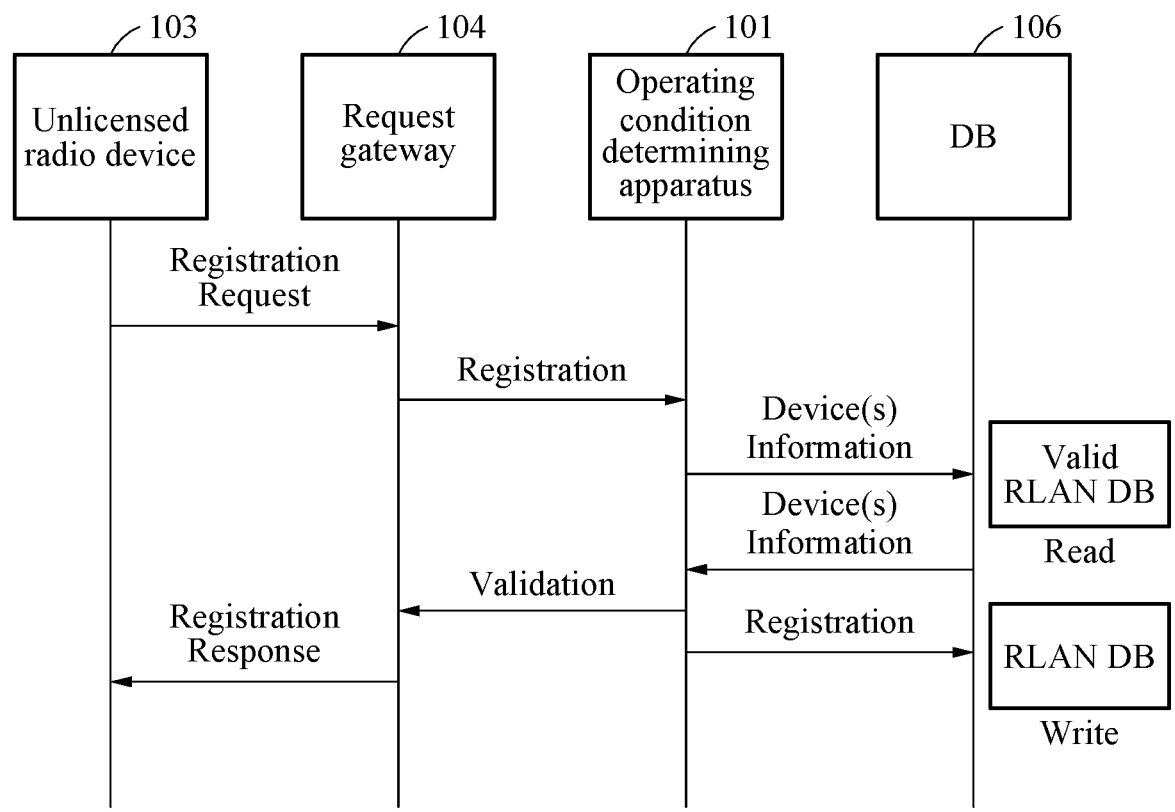
FIG. 6 illustrates an example of a method of registering an unlicensed radio device according to an example embodiment.

FIG. 6 illustrates an example of a method of registering an unlicensed radio device according to an example embodiment.

An operating condition determining apparatus may perform the following functions.

Function 1) Registration of an unlicensed radio device (RLAN) (registration)

Function 2) Providing of basic sharing operation information (spectrum sharing information)

Function 3) Periodical validation of a registered unlicensed radio device

Function 4) Update of sharing operation information

Function 5) Management of spectrum measurement information

Function 6) Providing of a sharing operating condition parameter

Each function may be an example of an operation procedure or a message transfer procedure in which the operating condition determining apparatus performs a response in response to a request from a proxy that manages a single unlicensed radio device or a plurality of unlicensed radio devices or a sensor for spectrum measurement.

Referring to FIG. 6, the operating condition determining apparatus 101 may perform a function of registering the unlicensed radio device (RLAN) 103.

The process of registering the unlicensed radio device (RLAN) 103 according to function 1 may be performed as follows. Description may be made by defining a proxy that manages a single unlicensed radio device 103 or a plurality of unlicensed radio devices 103 or a network of a service provider as an unlicensed entity. The database (DB) 106 represents a database. When registration is completed with a valid RLAN DB including information capable of validating validity of the unlicensed radio device 103 as a detailed structure of the DB 106, an RLAN DB to include information of a corresponding RLAN may be written. In the case of not storing information of the unlicensed radio device 103, the RLAN DB and the message transfer process may be excluded. The request gateway (RG) 104 refers to a module that accesses the operating condition determining apparatus 101 from an outside.

Figure 7:
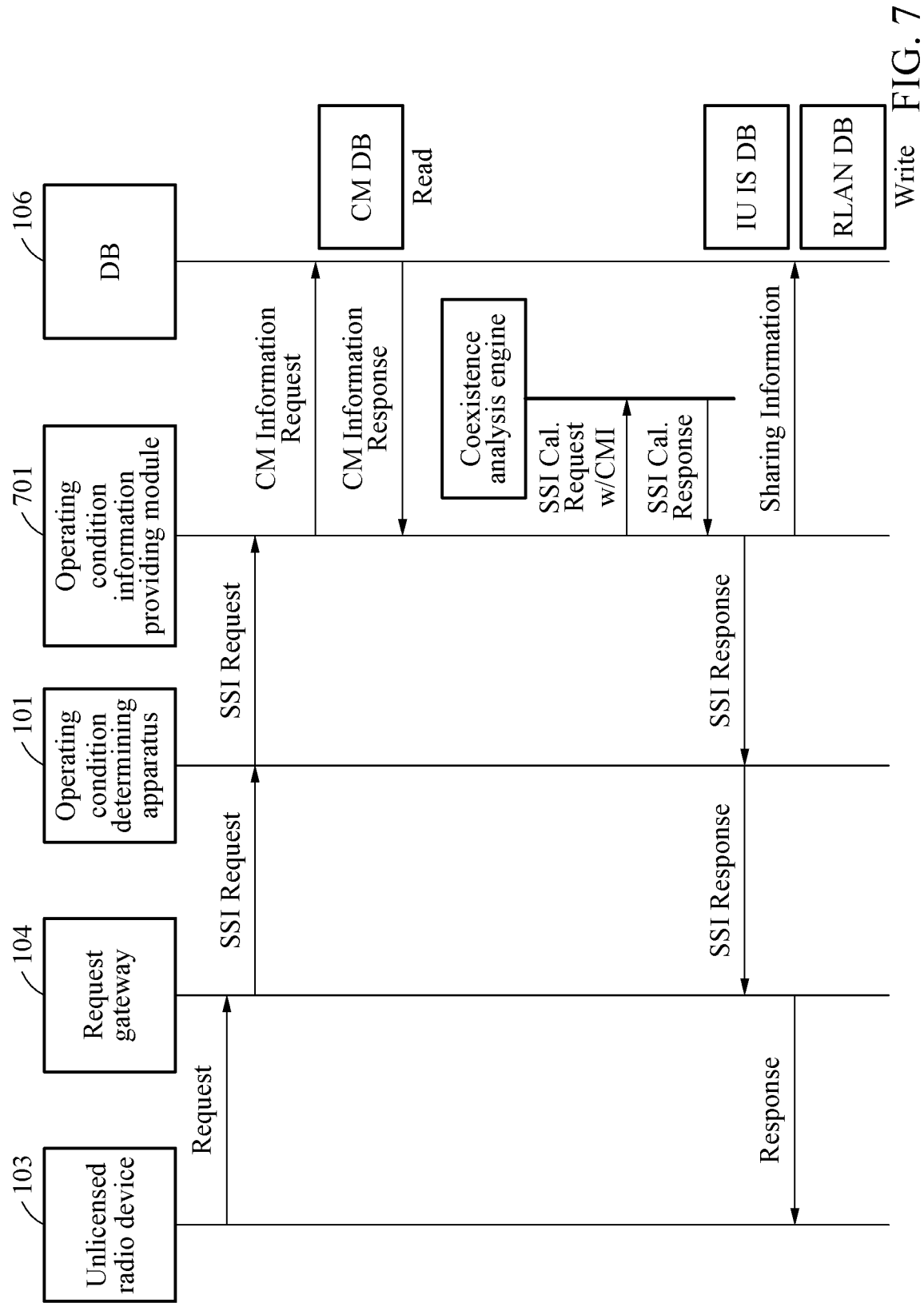
FIG. 7 illustrates an example of a method of providing sharing operation information to a registered unlicensed radio device according to an example embodiment.

FIG. 7 illustrates an example of a method of providing sharing operation information to a registered unlicensed radio device according to an example embodiment.

Referring to FIG. 7, the operating condition determining apparatus 101 may perform a function of providing basic sharing operation information.

The process of providing basic sharing operation information (spectrum sharing information) according to function 2) may be performed as follows. The unlicensed radio device 103 may transfer sharing operation information at the same time of registration to a sharing system through the operating condition determining apparatus 101, or may request sharing operation information regardless of the registration.

An operating condition information providing module (SSI) 701 refer to a module configured to operate through interaction with the operating condition determining apparatus 101 and to calculate sharing operation information. An example embodiment defines a procedure of calculating sharing operation information based on static information and dynamic information through a CM DM (static information database) and a coexistence analysis engine.

Also, the DB 106 configured to manage information provided to the unlicensed radio device 103 and a related procedure are defined together. The DB 106 may store and manage information about an existing service radio station (incumbent user IU) related to information provided to the unlicensed radio device 103 and information about an unlicensed radio device related to the DB 106 (IU DB). Also, the DB 106 may additionally store and manage information provided to each registered unlicensed radio device.

Here, if necessary, a process of transferring information to the IU DB and the RLAN DB and a procedure of storing and managing data may be excluded. Also, information related to the operating condition information providing module 701, that is, sharing operation information may be included in a message that responds to the unlicensed radio device 103 according to the periodical validation procedure of function 3).

Figure 8:
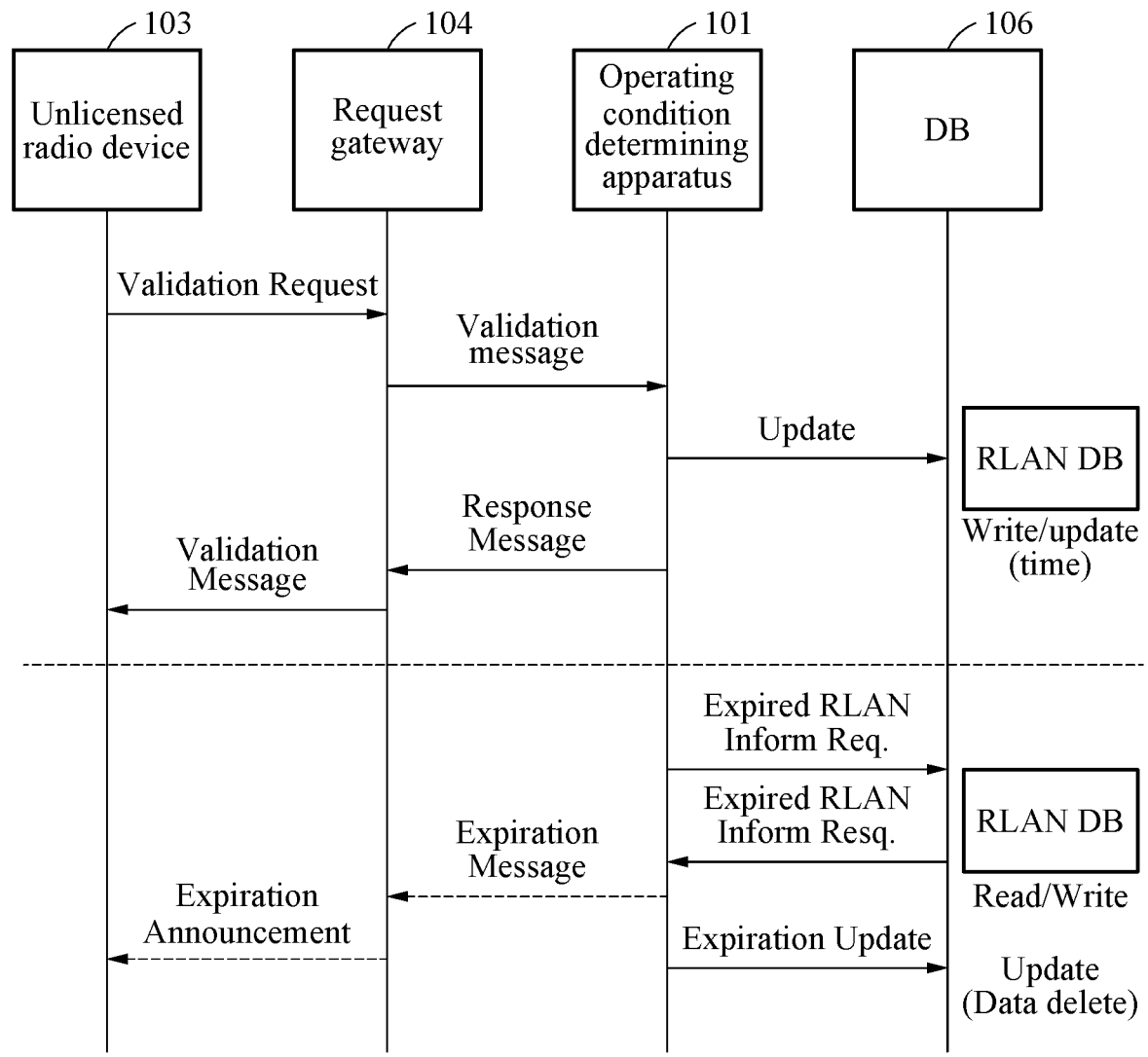
FIG. 8 illustrates an example of a method of periodically validating a registered unlicensed radio device according to an example embodiment.

FIG. 8 illustrates an example of a method of periodically validating a registered unlicensed radio device according to an example embodiment.

Referring to FIG. 8, the operating condition determining apparatus 101 may perform a procedure of validating an operation position of a registered single unlicensed radio device or operation positions of a plurality of unlicensed radio devices.

Referring to the process of periodically validating a registered unlicensed radio device according to function 3), in response to a validation request from the unlicensed radio device 103, the operating condition determining apparatus 101 may update a validation point in time. Also, the operating condition determining apparatus 101 may cancel registration of the unlicensed radio device 103 of which the validation procedure is not performed during a desired period of time. In particular, as an example embodiment of managing a cumulative interference effect, the unlicensed radio device 103 excluded from [related to calculating a sharing operating condition into consideration of cumulative interference] of FIG. 13 may be considered.

Figure 9:
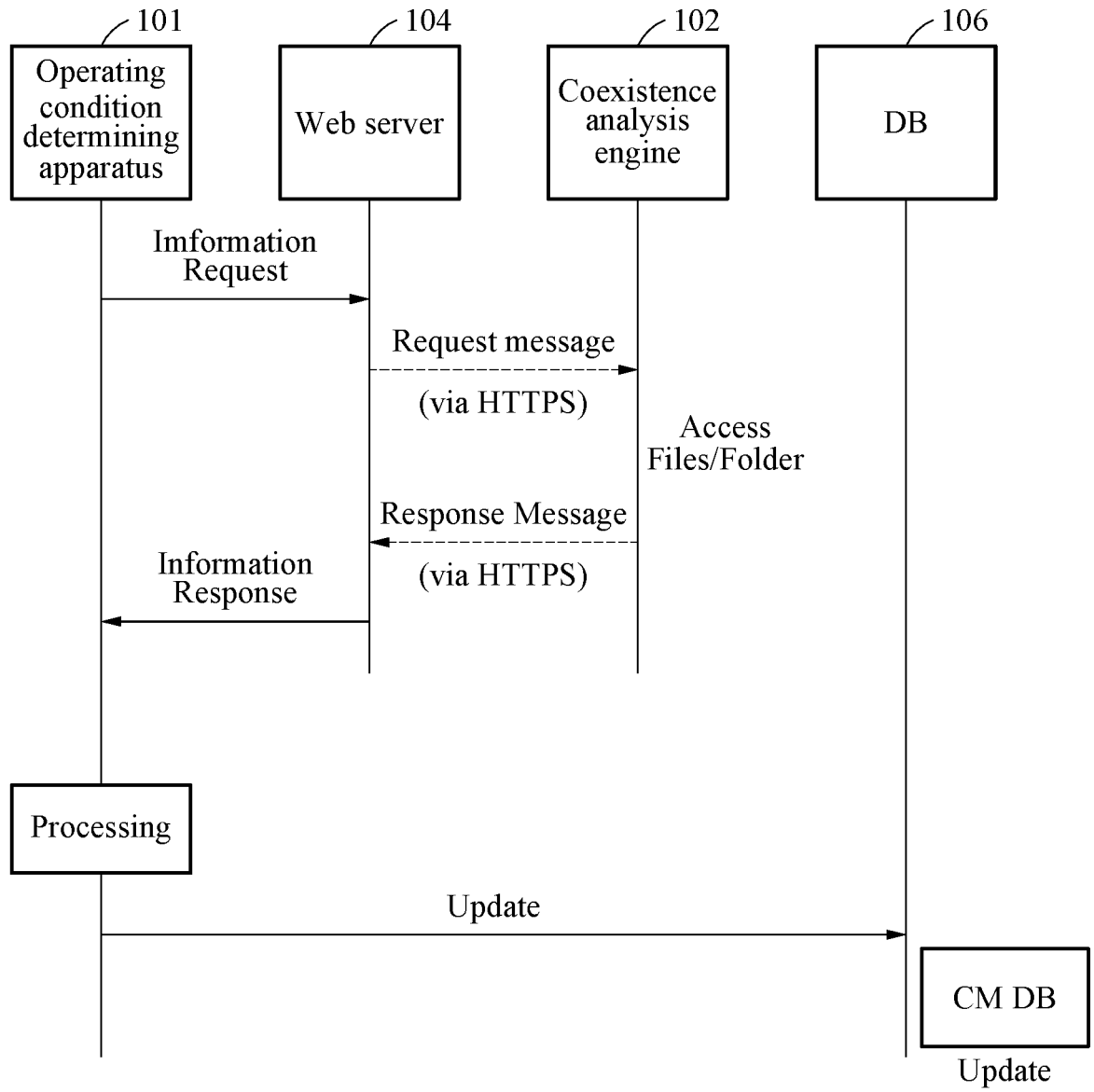
FIG. 9 illustrates an example of a method of updating sharing operation information provided to an unlicensed radio device according to an example embodiment.

FIG. 9 illustrates an example of a method of updating sharing operation information provided to an unlicensed radio device according to an example embodiment.

Referring to FIG. 9, the operating condition determining apparatus 101 may perform a function of updating sharing operation information.

Referring to the process of updating sharing operation information according to function 4, the operating condition determining apparatus 101 may perform an operation procedure with assumption that sharing operation information is present in an external module as a method of updating the sharing operation information. When a module is present inside, the operating condition determining apparatus 101 may perform a request and a response using an internal connection interface message.

Figure 10:
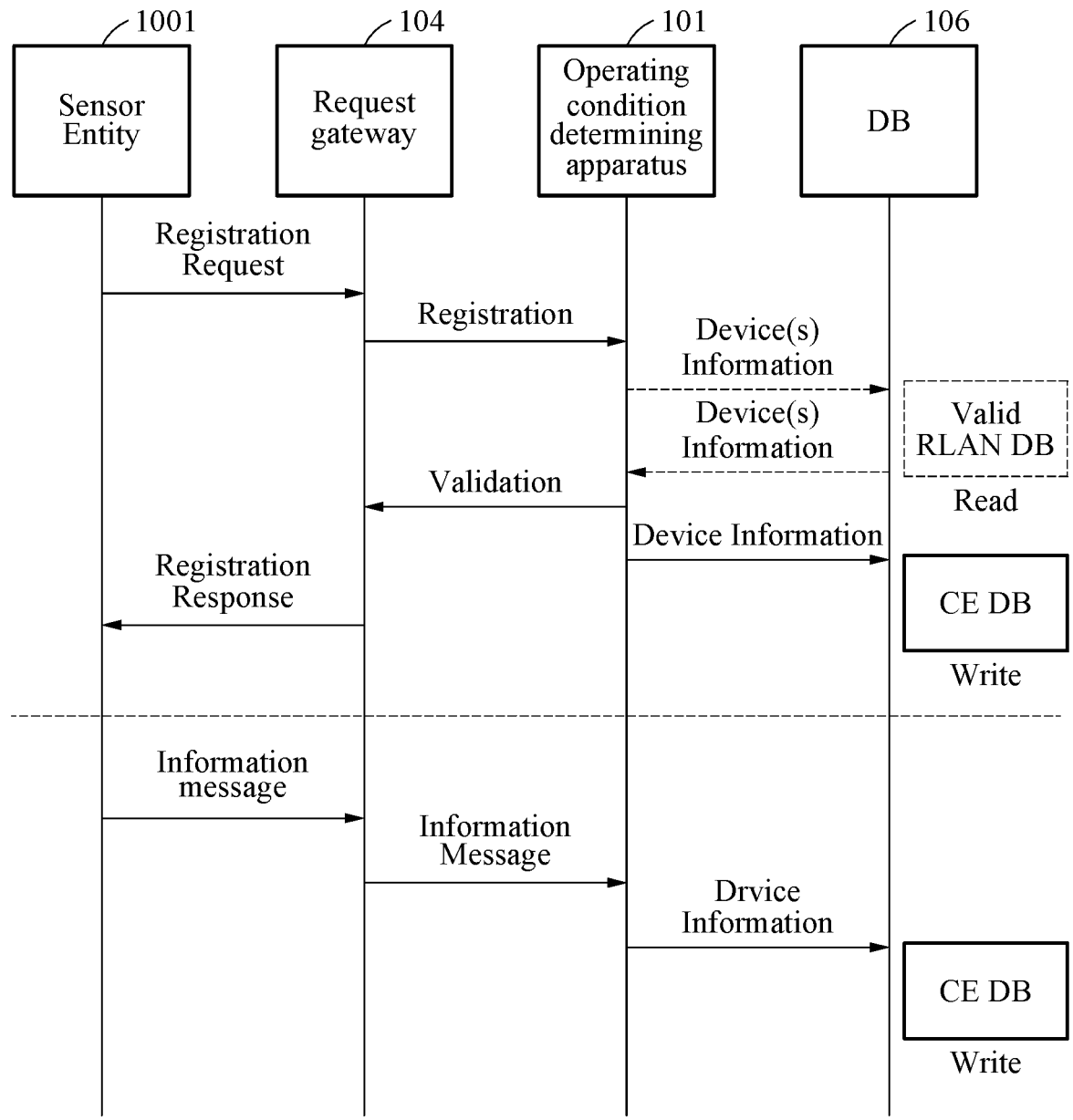
FIG. 10 illustrates an example of a method of registering and managing a sensor device according to an example embodiment.

FIG. 10 illustrates an example of a method of registering and managing a sensor device according to an example embodiment.

Referring to FIG. 10, the operating condition determining apparatus 101 may perform a function of managing spectrum measurement information.

Referring to the process of managing spectrum measurement information according to function 5), the operating condition determining apparatus 101 may perform an SS system registration procedure of a device (sensor) that measures a spectrum and a procedure of transferring measurement data to a sharing system and storing and managing data in the DB 106 (channel environment DB (CE DB)). A portion of defining registration validity of a sensor entity 1001 is represented with dotted lines and to be included in an RLAN registration DB. Unless a validity inspection of the sensor entity 1001 is required, the portion indicated with dotted portions may be excluded from the procedure.

Figure 11:
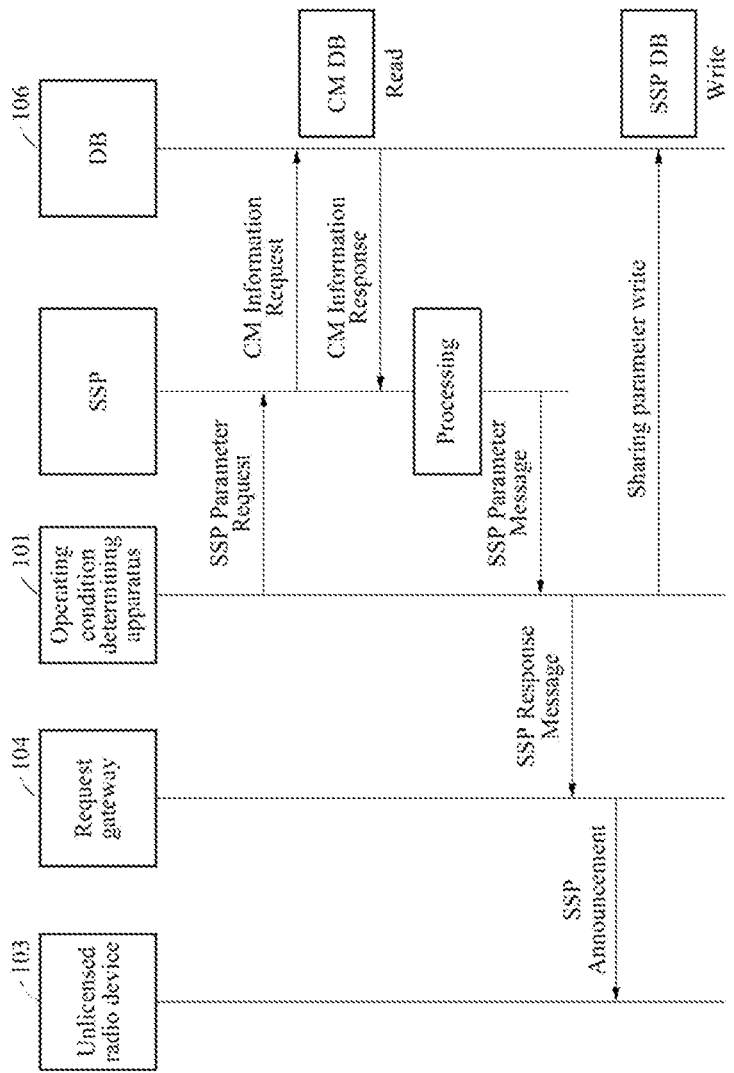
FIG. 11 illustrates an example of a method of calculating and providing a parameter that constitutes sharing operation information according to an example embodiment.

FIG. 11 illustrates an example of a method of calculating and providing a parameter that constitutes sharing operation information according to an example embodiment.

Referring to FIG. 11, the operating condition determining apparatus 101 may perform a function of providing a sharing operating condition parameter.

Referring to the process of providing a sharing operating condition parameter according to function 6), information about an existing service radio station may be included as spectrum measurement information. Alternatively, operation situation or channel use information of other RLAN devices may be included. If a radio station considering mobility for either transmission or reception or both transmission and reception is present as the existing service radio station, a sharing operating condition needs to be changed in response to a detection of a signal.

An operating condition for protecting an existing service that considers such mobility may be included in a function 6) message or a function 2) message. Function 6) may additionally include a sharing operating condition parameter between the plurality of unlicensed radio devices. An example embodiment relates to responding to a request for an optimal operating condition parameter shared between different unlicensed radio devices from spectrum sensing information or registered unlicensed radio device information or to providing the same from a sharing system. For reference, unlicensed radio devices may perform a random back-off function to access a channel and may provide a related parameter.

Figure 12:
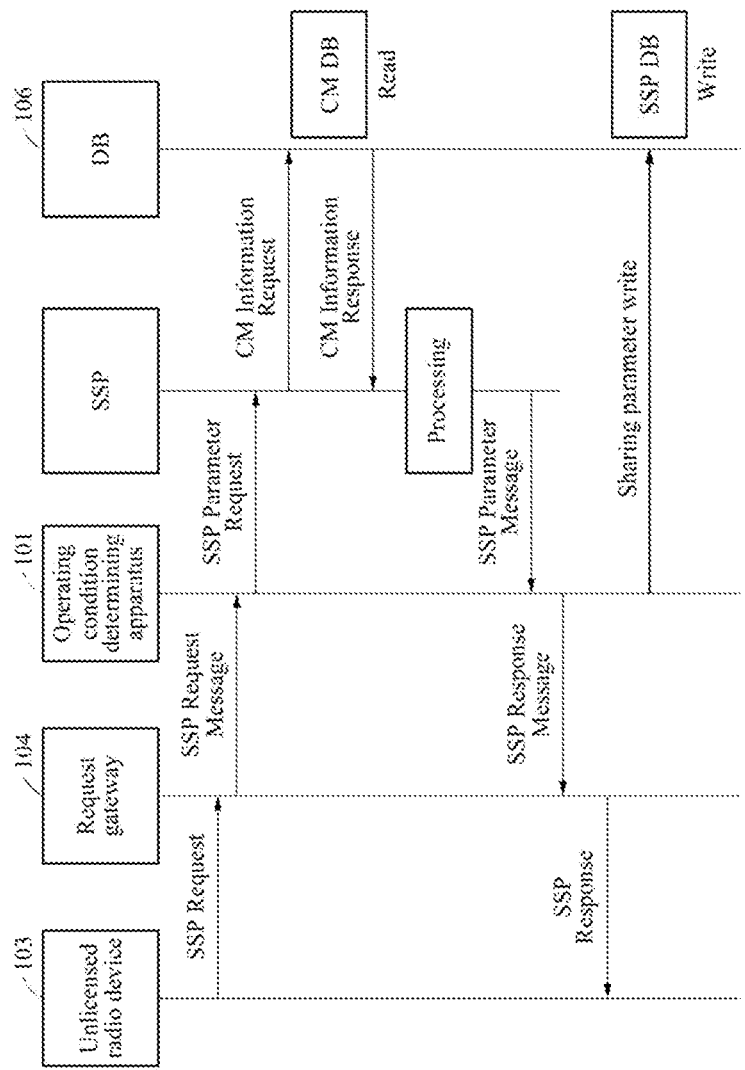
FIG. 12 illustrates an example of a method of calculating and providing related information in response to a request from an unlicensed radio device according to an example embodiment.

FIG. 12 illustrates an example of a method of calculating and providing related information in response to a request from an unlicensed radio device according to an example embodiment.

Referring to FIG. 12, the operating condition determining apparatus 101 may calculate an operating condition parameter based on a number of unlicensed radio devices 103 registered by a sharing system or spectrum measurement information and may provide the corresponding information to the unlicensed radio devices 103. For example, the operating condition determining apparatus 101 may calculate related information in response to a request from the unlicensed radio device 103 and may provide a calculation result to the unlicensed radio device 103.

Figure 13:
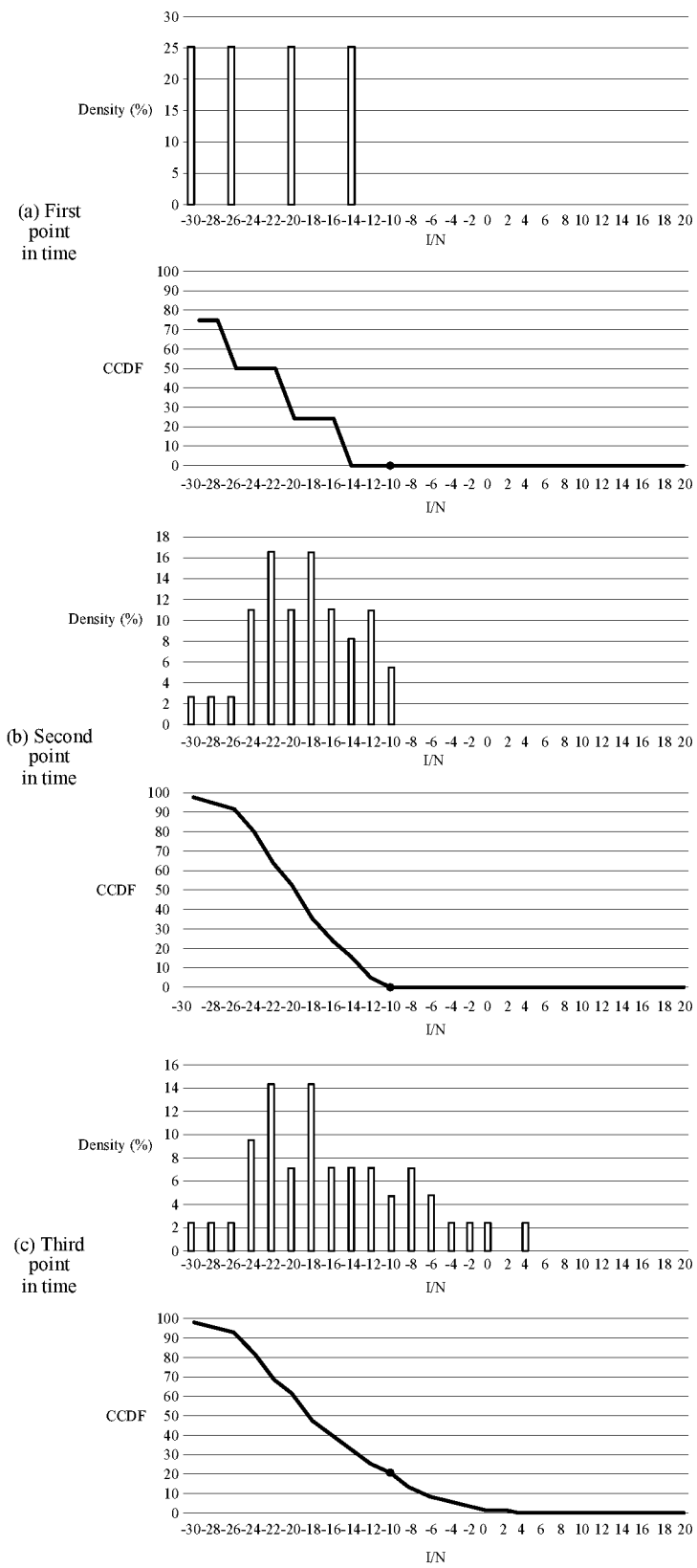
FIG. 13 illustrate an example of describing a complementary cumulative distribution function (CCDF) at a first point in time (a), a second point in time (b), and a third point in time (c) when two unlicensed radio devices are registered according to an example embodiment.

FIG. 13 illustrate an example of describing a complementary cumulative distribution function (CCDF) at a first point in time (a), a second point in time (b), and a third point in time (c) when two unlicensed radio devices are registered according to an example embodiment.

A sharing operating condition may be included in a response message from a sharing system in the following case, such as, for example, a case in which an unlicensed radio device requests a registration, a case in which the unlicensed radio device periodically validates the registration, and a case in which the unlicensed radio device requests an operating condition.

[Related to Calculating a Sharing Operating Condition into Consideration of Cumulative Interference]

Herein, the sharing operating condition may be calculated based on a variety of information and transferred to an unlicensed radio device, or an apparatus that receives information from the unlicensed radio device may be defined as the sharing system and used.

Hereinafter, an example of the sharing operating condition of the unlicensed radio device that is calculated by the sharing system and transferred to the unlicensed radio device is described. The sharing operating condition may include available radiated power or power density within an arbitrary frequency or frequency range with respect to a position of the unlicensed radio device. The sharing operating condition may be defined as an operable area or an inoperable area based on predetermined radiated power or power density in a specific frequency or frequency range.

A sharing operating condition for a single unlicensed radio device may be immediately calculated based on a sharing standard into consideration of an operation environment of the unlicensed radio device and a distance from an interferee. However, if a plurality of unlicensed radio devices desires to be present around the same interferee, a method of considering effect from the plurality of unlicensed radio devices may be required. This is not because each unlicensed radio device emits a signal at all times but because sharing effect may vary based on a position of each unlicensed radio device.

① Method 1

An example embodiment for solution may be classified as follows and a combination of each example embodiment may be included in a single example embodiment.

1) Considering an Operation Period (a Duty Cycle or a Radio Frequency (RF) Activity Factor) of an Unlicensed Radio Device:

Further detailed description related to an operation period (also, referred to as a duty cycle or an RF activity factor) of an unlicensed radio device may be made as follows as: Description is made by defining an unlicensed radio device that requests an area of affecting a target interferee for sharing operation information as a registered unlicensed radio device.

In stage 1, all the interference effect according to radiated power or power density of a registered unlicensed radio device may be cumulatively defined as total interference effect.

In stage 2, an effect level of an operation period of the unlicensed radio device may be calculated. For example, with the assumption that the operation period is 10%, the effect level may be calculated as 10 log 10(0.1).

In stage 3, a modified interference effect in which an operating period effect level is applied to a total interference effect is defined.

In stage 4, the modified interference effect is compared to an interference standard. Also, sharing operation information is provided to an unlicensed radio device that requests a new sharing operating condition based on the modified interference effect.

In stage 5, if necessary, the new sharing operating condition may be provided to all the unlicensed radio devices that affect a target interferee. It is to consider registration of a new unlicensed radio device or to improve fairness between the respective unlicensed radio devices. Necessity of stage 5 may be determined based on a purpose and a standard. Here, order of some stages may be changed.

2) Considering a Distribution According to a Combination for Each Interference Level of a Registered Unlicensed Radio Device Further detailed description related to considering a distribution for each interference level of a registered unlicensed radio device is made as follows: Description is made by defining an unlicensed radio device that requests an area affecting a target interferee for sharing operation information as a registered unlicensed radio device.

In stage 1, all combinations of interference effect according to radiated power or power density of registered unlicensed radio devices are calculated. For example, if three unlicensed radio device are registered, eight combinations may be calculated. Here, if a new unlicensed radio device is registered, 16 combinations may be generated.

In stage 2, every time a combination is calculated, a density distribution of combined interference level may be derived.

In stage 3, a density sum of interference effect combinations greater than an interference effect standard may be calculated and compared to a specific threshold ratio.

In stage 4, if the density sum is greater than or equal to the threshold ratio, interference effect may be determined to be present.

In stage 5, if interference effect is present based on an unlicensed radio device that requests a new registration, a sharing operating condition about a corresponding frequency use may not be provided as method 1.

② Method 2

Method 2 may provide a sharing operating condition to a new unlicensed radio device requesting registration while providing a new sharing operating condition to all the existing registered unlicensed radio device, such that the new unlicensed radio device may be registered.

③ Method 3

Method 3 may provide a new sharing operating condition to all the unlicensed radio devices if a predetermined period of time is elapsed after initially providing an operating condition using method 1. As a value to be applied in stage 3, an interference effect standard may use an interference to noise (I/N) of −10 dB and a threshold ratio of 20%. FIG. 13 illustrates an example of a change in I/N density and CCDF of each I/N value according to an increase in the number of registered unlicensed radio devices, starting from a first point in time (a) in which a number of registered unlicensed radio devices is two. At a third point in time (c), I/N=−10 dB is exceeded due to effect of an unlicensed radio device desired to be registered. In this case, the sharing system may provide the sharing operating condition to the unlicensed radio device using five-stage method 1, method 2, and method 3.

Figure 14:
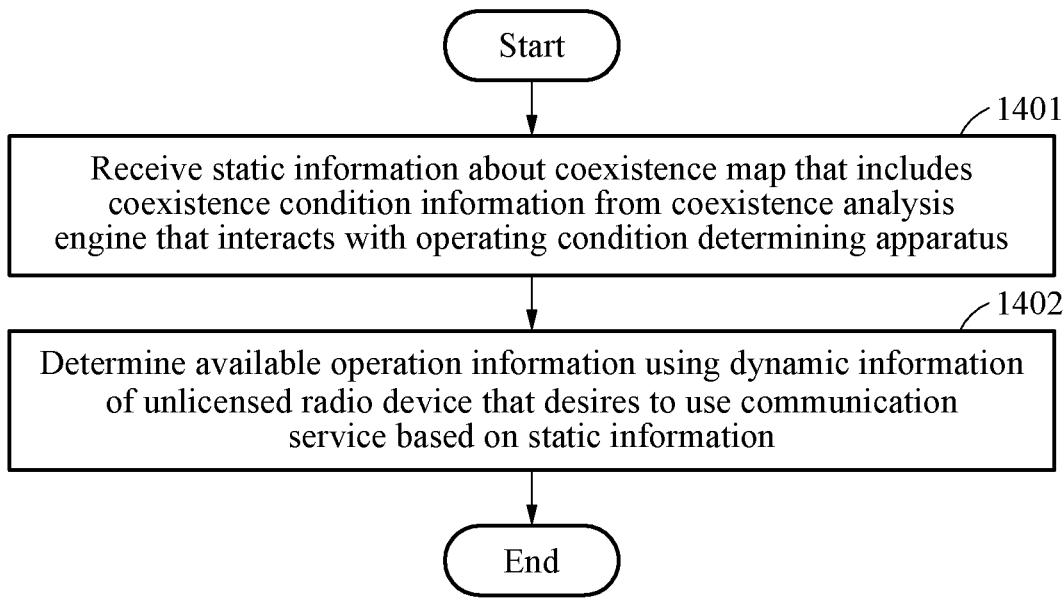
FIG. 14 is a flowchart illustrating an example of an operating condition determining method performed by an operating condition determining apparatus according to an example embodiment.

FIG. 14 is a flowchart illustrating an example of an operating condition determining method performed by an operating condition determining apparatus according to an example embodiment.

Referring to FIG. 14, in operation 1401, the operating condition determining apparatus may receive static information about a coexistence map that includes coexistence condition information from a coexistence analysis engine that interacts with the operating condition determining apparatus.

In operation 1402, the operating condition determining apparatus may determine available operation information using dynamic information of an unlicensed radio device that desires to use a communication service based on the static information. The operating condition determining apparatus may determine available operation information that includes at least one of an output level, an available channel, and an interference level triggered by a clutter based on the static information.

In detail, the operating condition determining apparatus may determine a pathloss from a position of an unlicensed radio device installed in an existing radio station to the existing radio station based on the static information. The operating condition determining apparatus may determine a frequency dependent rejection (FDR) between the unlicensed radio device installed in the existing radio station and the existing radio station. The operating condition determining apparatus may calculate an interference level received at the existing radio station based on the FDR. The operating condition determining apparatus may calculate at least one of an available channel, a power density, and a power level of the existing radio station based on the interference level. The operating condition determining apparatus may set available operation information according to dynamic information based on at least one of the available channel, the power density, and the power level of the existing radio station.

Figure 15:
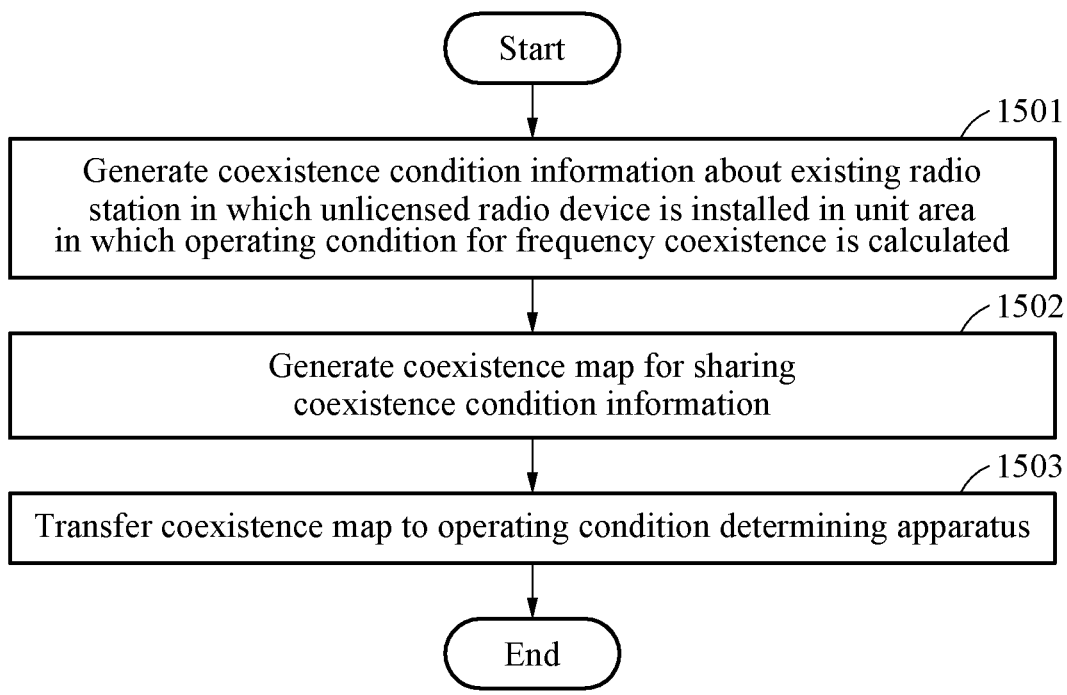
FIG. 15 is a flowchart illustrating an operating condition determining method performed by a coexistence analysis engine according to an example embodiment.

FIG. 15 is a flowchart illustrating an operating condition determining method performed by a coexistence analysis engine according to an example embodiment.

Referring to FIG. 15, in operation 1501, the coexistence analysis engine may generate coexistence condition information about an existing radio station in which an unlicensed radio device is installed in a unit area in which an operating condition for frequency coexistence is calculated. In response to an operation of the unlicensed radio device that is installed at a specific height of the existing radio station in the unit area, the coexistence analysis engine may generate coexistence condition information according to a position and a unit bandwidth of the unlicensed radio device. Here, the coexistence condition information may include at least one of protection target information associated with the existing radio station, basic information about the unit area, and sharing information associated with a frequency.

In operation 1502, the coexistence analysis engine may generate a coexistence map for sharing the coexistence condition information. The coexistence analysis engine may generate a coexistence map that sequentially includes frequencies of unit bandwidths included in a plurality of pieces of coexistence condition information, respectively, when the plurality of pieces of coexistence condition information correspond to the existing radio station and the different existing radio station.

In operation 1503, the coexistence analysis engine may transfer the coexistence map to an operating condition determining apparatus as static information.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

Meanwhile, the methods according to the above-described example embodiments may be prepared as a computer-executable program and may be implemented in various record media, such as, for example, magnetic storage media, optical record media, and digital storage media.

Implementations of various techniques described herein may be implemented in digital electronic circuitry, or in computer hardware, firmware, software, or some combinations thereof. The implementations may be implemented as a computer program product, that is, an information carrier, such as, for example, a machine-readable storage device (non-transitory computer-readable media) or a computer program tangibly embodied in a propagated signal to process operations of a data processing device, for example, a programmable processor, a computer, or a plurality of computers or to control the operations. A computer program, such as, the aforementioned computer program(s), may be recorded in any type of programming languages including compiled or interpreted languages and may be propagated in any type included as another unit suitable for use as a stand-alone program or in a module, a component, a subroutine, or a computing environment. The computer program may be distributed across a plurality of sites to be processed on a single computer or a plurality of computers at a single site and may be interconnected through a communication network.

Examples of processors suitable for processing the computer program include both general-purpose and special-purpose microprocessors and one or more processors of any type of digital computers. In general, a processor may receive instructions and data from read only memory (ROM) or random access memory (RAM) or from both ROM and RAM. Computer components may include at least one processor configured to execute instructions and one or more memory devices configured to store instructions and data. In general, a computer may include one or more mass storage devices, for example, magnetic disks, magneto-optical disks, or optical discs to store data, or may receive data therefrom or transmit data thereto, or may be coupled therewith to be bidirectional. Examples of information carriers suitable for embodiment computer program instructions and data include semiconductor memory devices, for example, magnetic media such as hard disks, floppy disks, and magnetic tapes; optical media such as compact disk read only memory (CD-ROM) and digital video disks (DVDs); magneto-optical media such as floptical disks; and hardware devices that are specially configured to store and perform program instructions, such as ROM, RAM, flash memory, erasable programmable ROM (EPROM), electrically erasable programmable ROM (EEPROM), and the like. The processor and memory may be supplemented by special-purpose logic circuitry or may be included therein.

Also, non-transitory computer-readable media may be any available media accessible by a computer and may include both computer storage media and a transmission media.

While this specification includes details of a plurality of specific example embodiments, they should not be construed as limiting to any disclosure or scope of claims, but rather should be understood as description of features that may be peculiar to a specific example embodiment. Specific features described herein in the context of individual example embodiments may be implemented through combination in a single example embodiment. Conversely, various features described in the context of a single example embodiment may also be implemented individually or in any suitable sub-combinations in a plurality of example embodiments. Further, although features may operate through particular combination and be described as claimed at an initial stage, one or more features from a claimed combination may be excluded from the combination in some cases and the claimed combination may be changed with a sub-combination or modification thereof.

Likewise, although operations are illustrated in specific order, it should not be understood that the operations should be performed in specific order or sequential order or all of the operations should be performed to achieve advantageous results. In a specific case, multitasking and parallel processing may be advantageous. Also, separation of various device components of the example embodiments should not be understood as requiring such separation in all the example embodiments and it should be understood that the aforementioned program components and devices may be integrated into a single software product or packaged into a plurality of software products.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An operating condition determining method performed by an operating condition determining apparatus, the operating condition determining method comprising:
   receiving static information about a coexistence map that comprises coexistence condition information from a coexistence analysis engine that interacts with the operating condition determining apparatus; and
   determining available operation information using dynamic information of an unlicensed radio device that desires to use a communication service based on the static information,
   wherein the determining of the available operation information comprises determining available operation information that comprises at least one of an output level which includes at least one of total radiated power and power density, an available channel, and an interference level triggered by a clutter based on the static information,
   wherein the determining of the available operation information comprises:
   determining a pathloss from a position of an unlicensed radio device installed in an existing radio station to the existing radio station based on the static information,
   determining a frequency dependent rejection (FDR) between the unlicensed radio device installed in the existing radio station and the existing radio station;
   calculating an interference level received at the existing radio station based on the FDR;
   calculating at least one of an available channel, a power density, and a power level of the existing radio station based on the interference level; and
   setting available operation information according to dynamic information based on at least one of the available channel, the power density, and the power level of the existing radio station,
   wherein the pathloss considers height information of the interferer, surrounding terrain and information about surrounding artificial structures,
   wherein the FDR is calculated based on a mask discrimination (MD) and a net filter discrimination.

2. The operating condition determining method of claim 1, wherein the FDR is calculated using a sum of the MD and the NFD.

3. The operating condition determining method of claim 2,
   wherein the MD represents a decrease amount of interference power occurring due to a filter shape of a Tx spectrum and an Rx selectivity mask, and wherein the NFD calculates an overlapping area according to center frequency offsets for a mask of the unlicensed radio device corresponding to the interferer and a mask of the existing radio station corresponding to the interferer.

4. The operating condition determining method of claim 3, wherein the determining of the FDR comprises determining the FDR based on a center frequency according to an operating bandwidth of the unlicensed radio device installed in the existing radio station and a center frequency according to an operating bandwidth of the existing radio station.

5. The operating condition determining method of claim 3, wherein the calculating of the at least one comprises consecutively calculating a power density according to a frequency separation based on the interference level.

6. The operating condition determining method of claim 3, wherein the calculating of the at least one comprises comparing an interference level according to a center frequency and a bandwidth of the unlicensed radio device installed in the existing radio station with a predefined protection standard and calculating the available channel and the power level.

7. An operating condition determining method performed by a coexistence analysis engine, the operating condition determining method comprising:
   generating coexistence condition information about an existing radio station in which an unlicensed radio device is installed in a unit area in which an operating condition for frequency coexistence is calculated;
   generating a coexistence map for sharing the coexistence condition information; and
   transferring the coexistence map to an operating condition determining apparatus,
   wherein the operating condition determining apparatus comprises:
   receiving static information about the coexistence map that comprises coexistence condition information from the coexistence analysis engine that interacts with the operating condition determining apparatus; and
   determining available operation information using dynamic information of the unlicensed radio device that desires to use a communication service based on the static information,
   wherein the determining of the available operation information comprises:
   determining available operation information that comprises at least one of an output level which includes at least one of total radiated power and power density, an available channel, and an interference level triggered by a clutter based on the static information, wherein the determining of the available operation information comprises:
   determining a pathloss from a position of an unlicensed radio device installed in an existing radio station to the existing radio station based on the static information;
   determining a frequency dependent rejection (FDR) between the unlicensed radio device installed in the existing radio station and the existing radio station;
   calculating an interference level received at the existing radio station based on the FDR;
   calculating at least one of an available channel, a power density, and a power level of the existing radio station based on the interference level; and
   setting available operation information according to dynamic information based on at least one of the available channel, the power density, and the power level of the existing radio station,
   wherein the pathloss consider height information of the interferer, surrounding terrain, and information about surrounding artificial structures,
   wherein the FDR is calculated based on a mask discrimination (MD) and a net filter discrimination (NFD).

8. The operating condition determining method of claim 7, wherein the generating of the coexistence condition information comprises, in response to an operation of the unlicensed radio device that is installed at a specific height of the existing radio station in the unit area, generating coexistence condition information according to a position and a unit bandwidth of the unlicensed radio device.

9. The operating condition determining method of claim 7, wherein the coexistence condition information comprises at least one of protection target information associated with the existing radio station, basic information about the unit area, and sharing information associated with a frequency.

10. The operating condition determining method of claim 7, further comprising:
   setting coexistence condition information based on the existing radio station and an existing radio station different from the existing radio station when the existing radio station and the different existing radio station are present in the unit area.

11. The operating condition determining method of claim 10, wherein the setting of the coexistence condition information comprises calculating coexistence condition information according to a position and a unit bandwidth of the different existing radio station by considering an interference effect with the different existing radio station based on the coexistence condition information.

12. The operating condition determining method of claim 7, wherein the generating of the coexistence map comprises generating a coexistence map that sequentially comprises frequencies of unit bandwidths comprised in a plurality of pieces of coexistence condition information, respectively, when the plurality of pieces of coexistence condition information correspond to the existing radio station and the different existing radio station.

13. An operating condition determining apparatus comprising:
   a processor,
   wherein the processor is configured to:
   receive static information about a coexistence map that comprises coexistence condition information from a coexistence analysis engine that interacts with the operating condition determining apparatus, and
   determine available operation information using dynamic information of an unlicensed radio device that desires to use a communication service based on the static information,
   wherein the determining of the available operation information comprises determining available operation information that comprises at least one of an output level which includes at least one of total radiated power and power density, an available channel, and an interference level triggered by a clutter based on the static information,
   wherein the determining of the available operation information comprises:
   determining a pathloss from a position of an unlicensed radio device installed in an existing radio station to the existing radio station based on the static information;
   determining a frequency dependent rejection (FDR) between the unlicensed radio device installed in the existing radio station and the existing radio station;
   calculating an interference level received at the existing radio station based on the FDR;
   calculating at least one of an available channel, a power density, and a power level of the existing radio station based on the interference level; and
   setting available operation information according to dynamic information based on at least one of the available channel, the power density, and the power level of the existing radio station,
   wherein the pathloss consider height information of the interferer, surrounding terrain, and information about surrounding artificial structures,
   wherein the FDR is calculated based on a mask discrimination (MD) and a net filter discrimination (NFD).

* * * * *